(12) United States Patent
Da Pra'

(10) Patent No.: US 7,073,905 B2
(45) Date of Patent: Jul. 11, 2006

(54) EYEGLASSES PRESET FOR CONNECTION TO CELLULAR TELEPHONES FOR TRANSMITTING AND RECEIVING CALLS

(75) Inventor: Silvio Da Pra', Vigo di Cadore (IT)

(73) Assignee: FOVS S.r.l., Lozzo di Cadore (IT)

( * ) Notice: Subject to any disclaimer, the term of this patent is extended or adjusted under 35 U.S.C. 154(b) by 13 days.

(21) Appl. No.: 10/500,689

(22) PCT Filed: Jan. 15, 2003

(86) PCT No.: PCT/EP03/00368

§ 371 (c)(1),
(2), (4) Date: Jul. 2, 2004

(87) PCT Pub. No.: WO03/062906

PCT Pub. Date: Jul. 31, 2003

(65) Prior Publication Data

US 2005/0213026 A1    Sep. 29, 2005

(30) Foreign Application Priority Data

Jan. 24, 2002   (IT)   .................. PD20020007 U

(51) Int. Cl.
*G02C 1/00*   (2006.01)

(52) U.S. Cl. ...................................... 351/158; 381/381
(58) Field of Classification Search ................ 351/140, 351/158, 41; 381/381; 455/350, 351
See application file for complete search history.

(56) References Cited

U.S. PATENT DOCUMENTS

| 6,176,576 | B1 |   | 1/2001 | Green et al. ................ 351/123 |
| 6,409,338 | B1 | * | 6/2002 | Jewell ......................... 351/158 |
| 6,445,799 | B1 | * | 9/2002 | Taenzer et al. ............. 381/71.6 |
| 6,729,726 | B1 | * | 5/2004 | Miller et al. ................ 351/158 |
| 6,769,767 | B1 | * | 8/2004 | Swab et al. ................. 351/158 |

FOREIGN PATENT DOCUMENTS

| DE | 199 59 493 | 5/2000 |
| EP | 0 840 465 | 5/1998 |
| WO | 90/10361 | 9/1990 |
| WO | 99/23524 | 5/1999 |
| WO | 02/086599 | 10/2002 |

* cited by examiner

*Primary Examiner*—Huy K. Mai
(74) *Attorney, Agent, or Firm*—Modiano & Associati; Albert Josif; Daniel O'Byrne

(57) ABSTRACT

Eyeglasses comprising a microphone in the front part, electronic noise-reduction components, connection cables located inside the eyeglasses, and a connector for a cable for connection to a cellular telephone.

14 Claims, 3 Drawing Sheets

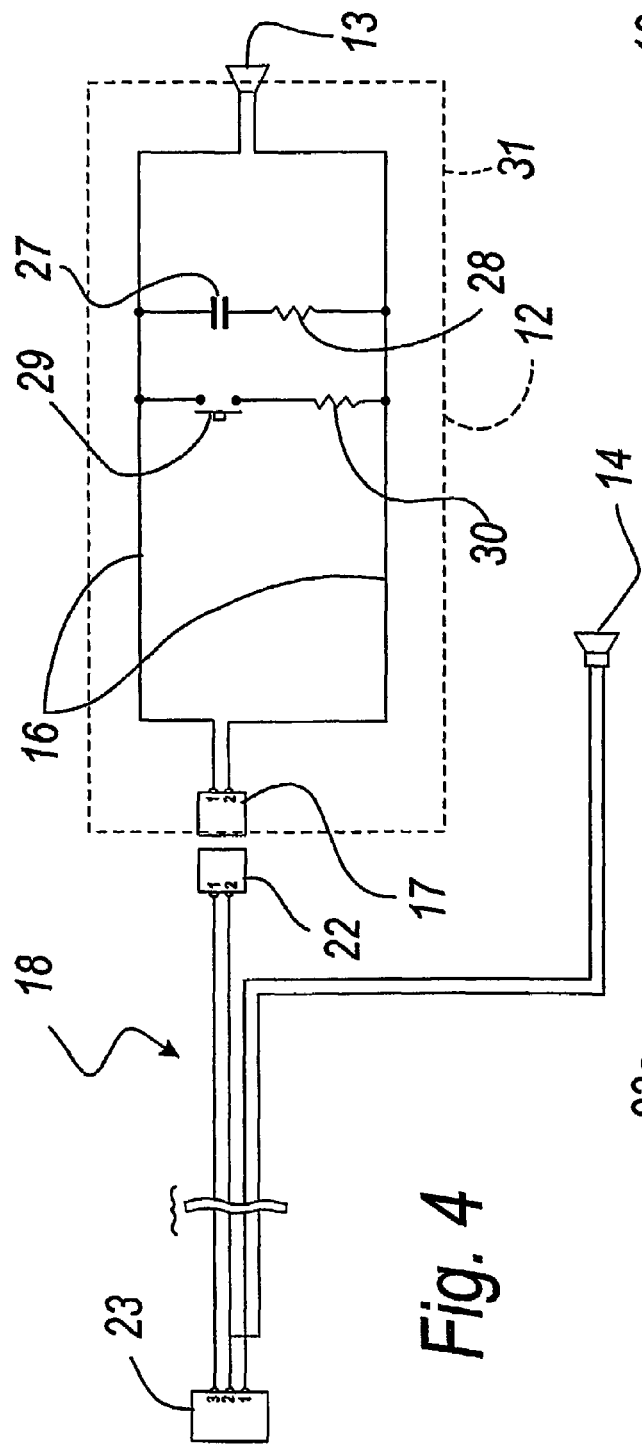
Fig. 4
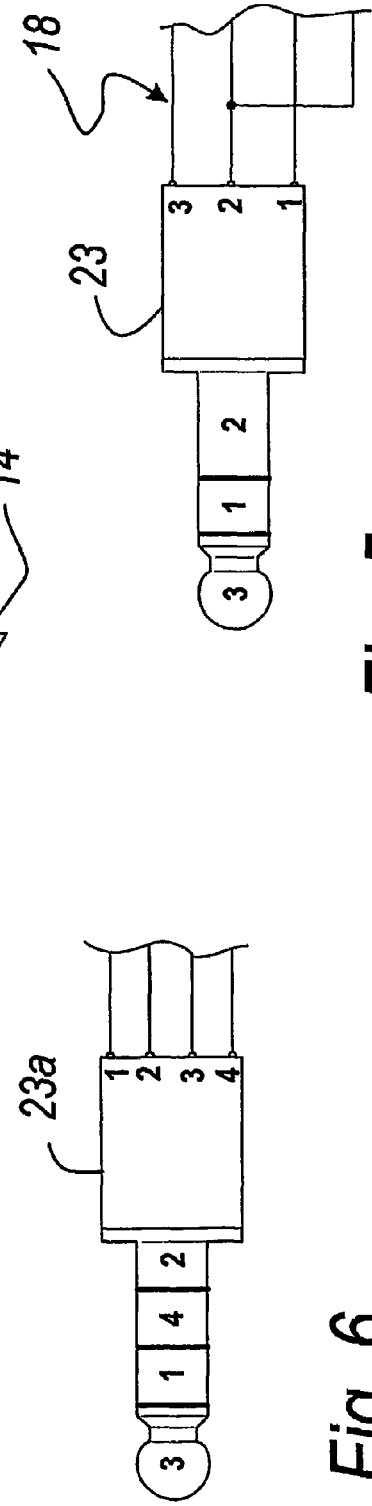
Fig. 5
Fig. 6

EYEGLASSES PRESET FOR CONNECTION TO CELLULAR TELEPHONES FOR TRANSMITTING AND RECEIVING CALLS

TECHNICAL FIELD

The present invention relates to a pair of eyeglasses preset for connection to cellular telephones for transmitting and receiving calls.

BACKGROUND ART

Over the last few decades, as telephony has developed, telephone connections have become increasingly frequent; however, while fixed telephones require interrupting any activity in order to make and/or receive calls, the arrival of the cellular telephone has given a new meaning to the concept of telephony, allowing telephone connections even in particular situations that are not strictly linked to the work or private environment and without the need to have a telephone connected to the telephone line by means of wires and placed in a specific room.

It is in fact possible to communicate substantially in any enclosed or open location covered by the telephone network and without necessarily having to interrupt activity or work.

However, the use of a cellular telephone, which entails the use of one's hands to hold and handle the device, reply and/or dial the number, as well as the use of one's sight to perform certain functions, distracts the user's attention and concentration from the activity he is performing, such as for example driving a vehicle, maneuvering a machine, performing sports activities, et cetera, possibly producing dangerous situations.

DISCLOSURE OF THE INVENTION

The aim of the present invention is to provide eyeglasses which, in addition to the normal optical and/or sunlight-barrier function, are capable of constituting a means for transmitting and receiving cellular telephone calls, so that the user can receive and make calls without taking his attention off the activity he is performing.

Within this aim, a consequent object of the invention is to provide eyeglasses that reduce the risk of emission of electromagnetic waves, which are believed to be dangerous for human organs such as the brain.

Another object is to provide eyeglasses that can be worn as easily and comfortably as conventional eyeglasses.

A further object is to provide eyeglasses that can be used with any kind of cellular telephone.

Another object is to provide eyeglasses in which the devices for transmitting and receiving cellular telephone calls are integrated so as to not alter their ergonomic features.

A still further object is to provide eyeglasses whose structure allows industrial-scale production at competitive costs.

This aim and these and other objects that will become better apparent hereinafter are achieved by eyeglasses, characterized in that they comprise a microphone in a front part thereof, electronic noise-reduction components, connection cables located inside the structure, and a connector for a cable for connection to a cellular telephone.

BRIEF DESCRIPTION OF THE DRAWINGS

Further characteristics and advantages of the invention will become better apparent from the following detailed description of an embodiment thereof, illustrated by way of non-limitative example in the accompanying drawings, wherein:

FIG. 4 is a circuit diagram of the components located inside the frame of the eyeglasses;

FIG. 5 is a detail view of a universal three-contact connector for a connecting cable that is used;

FIG. 6 is a detail view of a four-contact connector for a connecting cable that is used.

WAYS OF CARRYING OUT THE INVENTION

Figure 1:
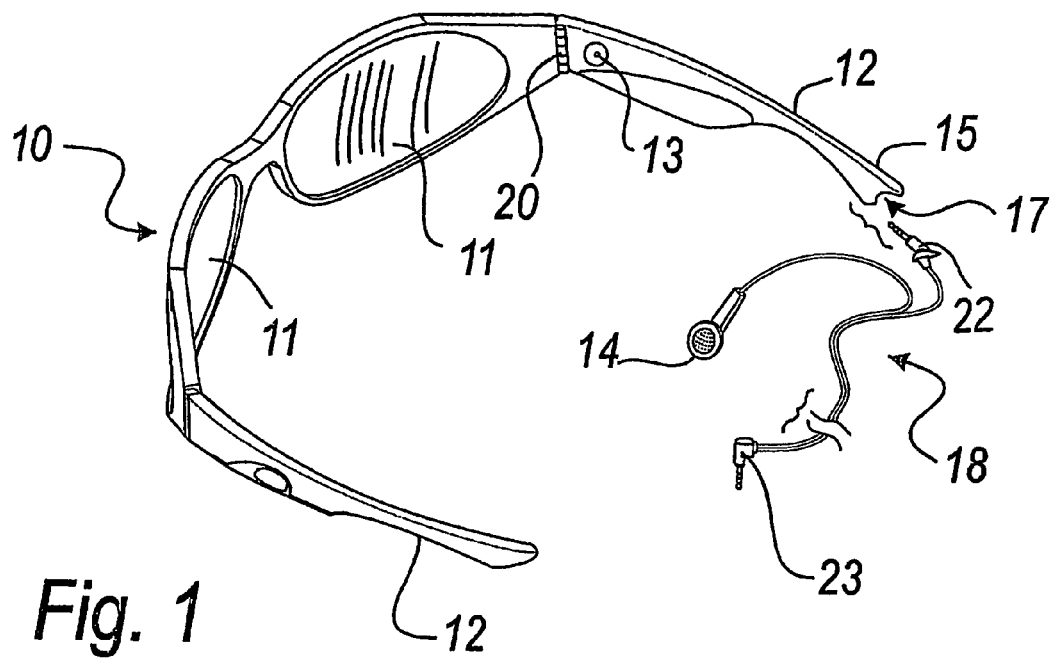
FIG. 1 is a rear perspective view of eyeglasses according to the invention.
Figure 2:
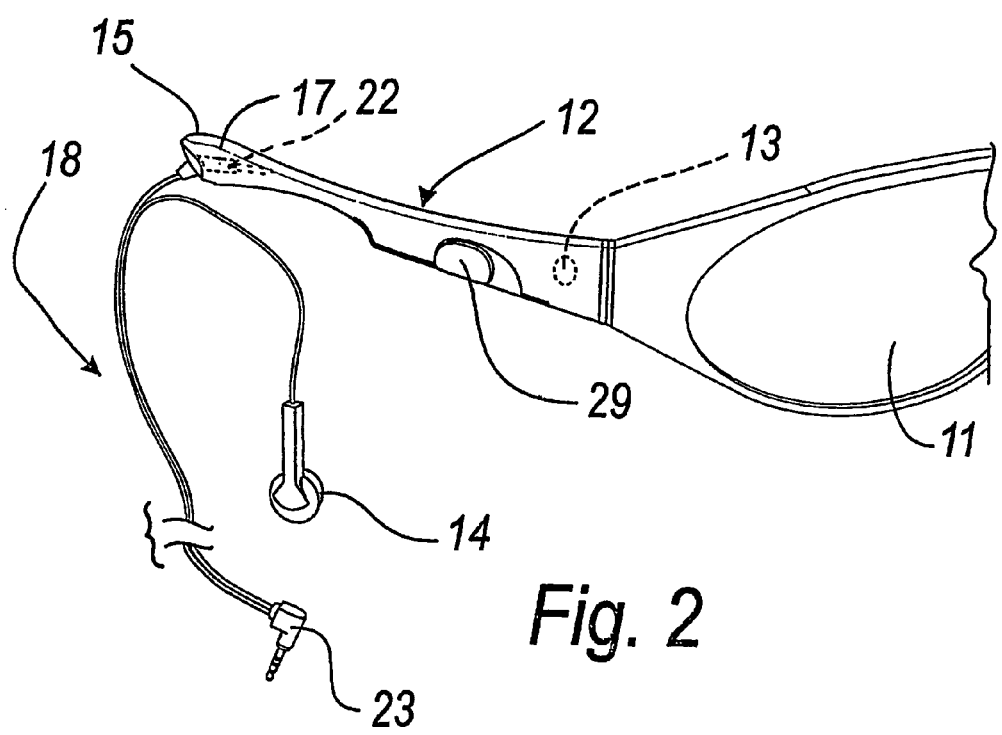
FIG. 2 is an enlarged-scale perspective view of a detail of the eyeglasses of FIG. 1.
Figure 3:
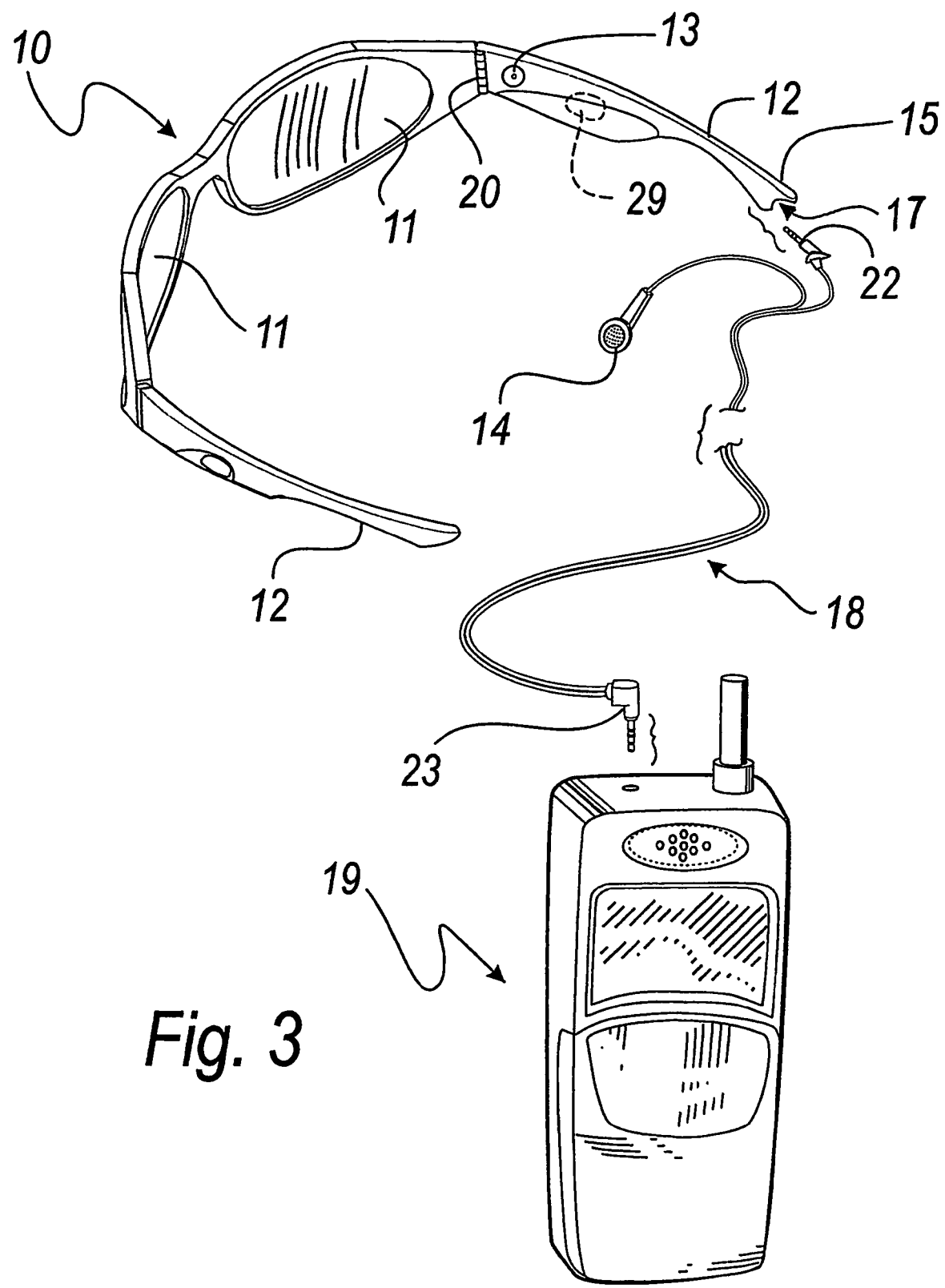
FIG. 3 is a perspective view of the eyeglasses of FIG. 1 with a corresponding telephone.

With reference to the FIG. 1–6, a pair of eyeglasses according to the invention is, as usual, constituted by a front 10, which support lenses 11 (of the sight-correcting type or of the sunlight-barrier type), to the ends of which temples 12 are articulated.

According to the invention, the eyeglasses comprise a microphone 13, preferably an ultraflat high-sensitivity one, which is located in the inner front part that is not in sight, for example of one of the temples 12. Electronic noise-reduction components, described hereinafter in greater detail, are also located inside the frame, as well as connecting cables 16. A connector 17 for a cable 18 for connection to a cellular telephone 19 is also provided.

The microphone 13 can also be integrated in the front 10, in which case electrical contacts for continuity must be provided at a corresponding hinge 20.

As regards the connector 17, it is of the female type and is embedded in a terminal 15, and can be of the commonly commercially available type that is complementary to a male connector 22 normally used in cellular telephone connections and located at the end of the connecting cable 18.

The connecting cable also comprises a branch, at the end of which an in-ear headset 14 is arranged.

The other end of the cable 18 is provided with another male connector 23, which can be inserted in a corresponding female connector 24 of the telephone 19.

The connector 23 can be either of the universal three-contact type (FIG. 5), or of the four-contact type (FIG. 6, designated by the reference numeral 23a).

The connector 17 is conveniently of the three-contact type in order to interface with all telephone connection kits.

The connecting cables 16 (preferably of the shielded coaxial type in order to eliminate any interference) are embedded in the plastics material in the case of eyeglasses with a frame made of plastics, or are located inside hollow regions of the structure in the case of eyeglasses having a metal structure.

As regards the electronic noise reduction components, with particular reference to the previously cited FIG. 4, an SMD passive noise reduction component is arranged in parallel to the microphone 13; such component is constituted by a capacitor 27 with a resistor 28 in series, also of the SMD type, in order to eliminate all transmission noise caused by electrostatic discharges.

A button 29 is further integrated in the temple 12, adjacent to the microphone 13, and is connected in parallel to the microphone 13 and in series to an interface resistor 30, which allows to recognize the clearance signal given by the button 29.

The button 29, which avoids the need to pull out the telephone whenever it is used, has at least one of the following functions:

manual answer (call acceptance);

end of call;

voice call start.

In a board 31 on which the electronic components are located, the surface arranged opposite the components is shielded with conducting material in order to avoid external noise.

In practice it has been found that the intended aim and objects of the present invention have been achieved.

The eyeglasses in fact appear to be entirely similar to normal corrective eyeglasses or sunglasses and can be used normally for this purpose, with the additional possibility, for example when driving, motorcycling, cycling or in other situations, to connect the microphone, by means of a cable, to a cellular telephone and to a corresponding in-ear headset and therefore to be able to transmit and receive calls.

Moreover, with the automatic answer function it is not necessary to hold the telephone in one's hand, and by means of the button 29 it is possible to make calls locally without taking one's sight off the action, avoiding dangerous situations that can occur when driving a car.

In practice, the materials used, so long as they are compatible with the contingent use, as well as the dimensions, may be any according to requirements.

The disclosures in Italian Utility Model Application No. PD2002U000007 from which this application claims priority are incorporated herein by reference.

What is claimed is:

1. Eyeglasses, comprising a microphone in a front part thereof, electronic noise-reduction components, connection cables located inside the eyeglasses, and a connector for a cable for connection to a cellular telephone.

2. The eyeglasses of claim 1, wherein said microphone is located in the internal part thereof that is not visible.

3. The eyeglasses of claim 1, wherein said microphone is integrated in the front part of a temple.

4. The eyeglasses of claim 1, wherein said microphone is integrated in the front.

5. The eyeglasses of claim 1, wherein said connecting cables are embedded in plastics material in the case of eyeglasses having a plastics frame.

6. The eyeglasses of claim 1, wherein said connecting cables are located inside hollow regions of the eyeglasses in the case of metal eyeglasses.

7. The eyeglasses of claim 1, wherein said connector is a female connector embedded in a corresponding terminal, said female connector being complementary to connectors used in cellular telephony connections.

8. The eyeglasses of claim 1, wherein said electronic noise reduction components comprise an SMD passive noise reduction component, which is connected in parallel to said microphone and is constituted by a capacitor and, in series with said capacitor, a resistor, also of the SMD type.

9. The eyeglasses of claim 1, wherein said connecting cables are of the shielded coaxial type.

10. The eyeglasses of claim 1, wherein for noise reduction there is a shielding, made of conducting material, of a base on which the electronic components are located, said shielding being provided on an opposite surface with respect to said components.

11. The eyeglasses of claim 1, wherein a button is integrated in a frame of the eyeglasses and is connected in parallel to said microphone.

12. The eyeglasses of claim 11, wherein said button is arranged in series to an interfacing resistor, which allows to recognize the clearance signal given thereby.

13. The eyeglasses of claim 11, wherein said button has at least one of the following functions:

manual answer (call acceptance);

end of call;

voice call start.

14. A connecting cable for eyeglasses, comprising, at its ends, respective connectors, one of said connectors being complementary to a connector of the eyeglasses and one of said connectors being complementary to a connector of a telephone, said cable having a branch with an in-ear headset.

* * * * *